(12) United States Patent
Owczarski et al.

(10) Patent No.: US 10,268,334 B2
(45) Date of Patent: Apr. 23, 2019

(54) SYSTEM FOR COMMUNICATING AVIONICS INFORMATION THROUGH PORTABLE ELECTRONIC DEVICES

(71) Applicant: Astronautics Corporation of America, Milwaukee, WI (US)

(72) Inventors: David Owczarski, Cudahy, WI (US); Jason Shuler, Menomonee Falls, WI (US)

(73) Assignee: Astronautics Corporation of America, Milwaukee, WI (US)

(*) Notice: Subject to any disclaimer, the term of this patent is extended or adjusted under 35 U.S.C. 154(b) by 233 days.

(21) Appl. No.: 15/116,548

(22) PCT Filed: Feb. 20, 2015

(86) PCT No.: PCT/US2015/016816
§ 371 (c)(1),
(2) Date: Aug. 4, 2016

(87) PCT Pub. No.: WO2015/127203
PCT Pub. Date: Aug. 27, 2015

(65) Prior Publication Data
US 2016/0349933 A1 Dec. 1, 2016

Related U.S. Application Data

(60) Provisional application No. 61/942,931, filed on Feb. 21, 2014.

(51) Int. Cl.
*G06F 3/0481* (2013.01)
*B64D 43/00* (2006.01)
(Continued)

(52) U.S. Cl.
CPC .......... *G06F 3/0481* (2013.01); *B64D 43/00* (2013.01); *G06T 13/80* (2013.01); *H04L 67/141* (2013.01); *H04L 67/42* (2013.01)

(58) Field of Classification Search
CPC ..... G06F 3/0481; H04L 67/42; H04L 67/141; G06T 13/80; B64D 43/00
See application file for complete search history.

(56) References Cited

U.S. PATENT DOCUMENTS 9,483,839 B1 * 11/2016 Kwon ............... H04N 5/33
2003/0169335 A1 9/2003 Monroe
(Continued)

OTHER PUBLICATIONS

European Search Report dated Oct. 5, 2017; Applcation No. 15751917.4.
(Continued)

*Primary Examiner* — Bobbak Safaipour
(74) *Attorney, Agent, or Firm* — Boyle Fredrickson, S.C.

(57) ABSTRACT

A method and apparatus for using portable electronic devices such as commercial off-the-shelf cell phones and tablets for the communication of critical aviation data provides a protocol which minimizes processing by the portable electronic device other than the confirmation of a receipt of uncorrupted data. Failure of timely, accurate communication is detected at a certified avionics data server and communicated to the portable electronic device in the form of a fail-image. The communicated images may be composited with animated frames to provide a human recognizable indication of data integrity.

16 Claims, 3 Drawing Sheets

(51) Int. Cl.
  *G06T 13/80*  (2011.01)
  *H04L 29/06*  (2006.01)
  *H04L 29/08*  (2006.01)

(56) References Cited

U.S. PATENT DOCUMENTS

| | | |
|---|---|---|
| 2003/0200026 A1 | 10/2003 | Pearson |
| 2007/0027589 A1 | 2/2007 | Brinkley et al. |
| 2007/0055416 A1 | 3/2007 | Allen |
| 2010/0198431 A1 | 8/2010 | Corbefin |
| 2010/0289671 A1* | 11/2010 | Hauty .................. G01D 7/00 340/945 |
| 2011/0238239 A1 | 9/2011 | Shuler et al. |
| 2012/0142277 A1 | 6/2012 | Vermette et al. |
| 2012/0191273 A1 | 7/2012 | Jacobs et al. |
| 2013/0126679 A1 | 5/2013 | Estkowski et al. |
| 2013/0261847 A1 | 10/2013 | Myers et al. |
| 2014/0074322 A1 | 3/2014 | Baumgarten et al. |
| 2017/0301248 A1* | 10/2017 | Silverman .............. G08G 5/045 |
| 2018/0124075 A1* | 5/2018 | Belfy .................. H04L 9/0643 |

OTHER PUBLICATIONS

International Search Report & Written Opinion; International App No. PCT/US2015/016816, dated May 20, 2015.

* cited by examiner

SYSTEM FOR COMMUNICATING AVIONICS INFORMATION THROUGH PORTABLE ELECTRONIC DEVICES

CROSS REFERENCE TO RELATED APPLICATION

This application claims the benefit of U.S. provisional application No. 61/942,931 filed Feb. 21, 2014, and hereby incorporated by reference.

BACKGROUND OF THE INVENTION

The present invention relates to avionics and in particular to an avionics interface that uses portable electronic devices of the type intended for general consumer use.

Avionics are electronic systems used in aircraft and relied upon for the safe operation of the aircraft. The display systems used in avionics are specially designed to present avionics data, also critical to the safe operation of the aircraft, to aircraft personnel in a reliable, timely and accurate fashion. The FAA prescribes standards RTCA DO-178 and RTCA. DO-254 describing software and hardware development and testing of avionic systems to ensure the equipment's ability to present accurate and timely information to the operator under all conditions. This capability must be demonstrated to the FAA to obtain certification for an avionics display product.

Common electronic devices, such as tablet computers and smart phones (termed herein "portable electronic devices" or PEDs) have significantly changed how individuals interact with electronic data and are increasingly used in the aircraft cockpit for variety of noncritical functions. The ready availability of these devices and their versatility has created a strong push for increased use of such devices to provide avionics-type data to the pilot. Unfortunately, PEDs are not subject to rigorous, avionics-type testing and further normally include proprietary features that present an obstacle to a thorough understanding of their operation necessary for certification. Without properly meeting design assurance objectives, there is a risk that a PED used in critical aircraft functions could corrupt that data or fail in a way that presents misleading or inaccurate information.

SUMMARY OF THE INVENTION

The present invention provides a method of integrating common PEDs into critical aircraft operations potentially allowing these convenient, familiar, and powerful devices to be used to assist the pilot and crew. The method employs a certified avionics server that assumes substantially all processing of the information short of the final display step which is handled by the PED. By limiting the operation of the PEDs to basic display functions and by employing special data integrity protocols, the ability for the PEDs to convey misleading or inaccurate information is eliminated.

In one embodiment, the invention provides an avionics data server having a first interface communicating with at least one avionics bus, the latter conveying avionics data related to the safe operation of an aircraft A second interface of the avionics data server communicates with either a wireless access point or a direct wired connection for communicating with at least one portable electronic device having an electronic display. The avionics data server executes a program to perform the following steps:

(1) generate an image frame at the avionics data server from the avionics data, the image frame displayable to provide information related to the safe operation of the aircraft;

(2) determine a signature at the avionics data server, the signature providing a representation of data of the image frame;

(3) forward the image frame from the avionics data server to the portable electronic device;

(4) receive a confirming signature from the portable electronic device to the avionics data server, the confirming signature providing a representation of the image frame as received by the portable electronic device; and (5) compare the confirming signature to the signature at the avionics data server and, when they do not match, forwarding a fail-image frame to the portable electronic device, the fail-image frame displayable to provide information indicating the unreliability of displayed information on the portable electronic device.

It is thus a feature of the present invention to eliminate or greatly curtail the processing of the image by the PED thus reducing potential for corruption by the PED of that data or how it is perceived. Separately from the image processing task, the PED is enlisted to generate a signature of the received data so that the server can confirm the correctness of the data transmission. If the data was corrupted, this corruption is signaled to the PED with a fail-image that may be processed by the PED like all other images and that signals to the user that there has been a corruption of data. Using a fail-image that can be processed like any other image eliminates the need to expand the intentionally limited PED functions and hence the risk of data integrity affecting PED failure.

The server may further attach a frame sequence number to the image frame linked to the signature so when the PED returns a confirming signature, it may be linked to a frame sequence number of the received image frame. At the server, the step of comparing the confirming signature to the original signature compares a confirming signature and signature having matching frame sequence numbers.

It is thus a feature of at least one embodiment of the invention to prevent a false determination that data was correctly transmitted such as might occur if different frame sequence numbers having coincidentally identical data were compared.

The server may further set a timer at step (3) and may make the determination that the confirming signature and original signature do not match at the expiration of a predetermined time after setting of the timer if a matching signature and confirming signature is not established.

It is thus a feature of at least one embodiment of the invention to prevent processing delays in the comparison process, that delay a determination of data corruption, from being interpreted as a lack of data corruption. In this regard, the invention recognizes that eliminating delay in indicating data is corrupt is of critical importance.

The server may repeat step (1) to forward multiple sequential image frames and may composite each image frame before step (3) with an active-signal animation frame. The active-signal animation frame may be a frame of an animation set constructed so that when a different active-signal animation frame is composited with sequentially forwarded image frames and displayed, the image generated by the active-signal animation frames provides a perception of continuous predictable motion indicating receipt of the sequentially forwarded image frames to human observer.

It is thus a feature of at least one embodiment of the invention to address the possibility that the PED fails by freezing the display of a single frame without other outward manifestations of failure. By embedding an animation sequence into the frames from the server that does not rely on the processing, this failure type may be signaled to the human observer.

The animation set may provide active-signal animation frames of a rotating object.

It is thus a feature of at least one embodiment of the invention to provide an intuitively predictable animation that may be realized in a compact image set, for example with a small set of animation frames.

The avionics server may further authenticate the portable electronic device for communication of image frames from the avionics data server to the portable electronic device.

It is thus a feature of at least one embodiment of the invention to prevent improper transmission of avionics data to unauthorized systems.

The signature may be a cyclic redundancy code applied over the data of the image frame.

It is thus a feature of at least one embodiment of the invention to provide a robust signature-generating technique that may be scaled to large data sizes of video image frames.

The avionics data server may include a hardware signature generator generating the signature of step (2) independently from the processor of the avionics data server.

It is thus a feature of at least one embodiment of the invention to permit comprehensive signature generation of multiple video streams.

The hardware signature generator may be a field programmable gate array.

It is thus a feature of at least one embodiment of the invention to practically implement comprehensive signature checking in low-volume avionics systems that may not justify a custom integrated circuit The server may perform step (3) in response to a request for an image frame communicated from the portable electronic device to the avionics data server for each image frame.

It is thus a feature of at least one embodiment of the invention to flexibly tailor the data rate to the needs of the PED which may also be used for other purposes.

The image frame may display as a static image.

It is thus a feature of at least one embodiment of the invention to minimize or eliminate any post transmission processing by the PED, for example, in the generation of animations at the FED, such as might create the risk of data corruption under failures of the PED.

The image frame may provide data describing a set of pixel values for pixels ranging over two dimensions.

It is thus a feature of at least one embodiment of the invention to minimize or eliminate post transmission rendering by the PED, for example, processing graphical instructions, such as may increase potential for PED failures that critically affect the integrity of the transmitted data.

The server may repeat steps (1)-(5) at a rate of at least ten times per second.

It is thus a feature of at least one embodiment of the invention to provide a suitably high frame rate to permit the use of an active-signal animation described above.

These particular objects and advantages may apply to only some embodiments falling within the claims and thus do not define the scope of the invention.

DETAILED DESCRIPTION OF THE PREFERRED EMBODIMENT

Figure 1:
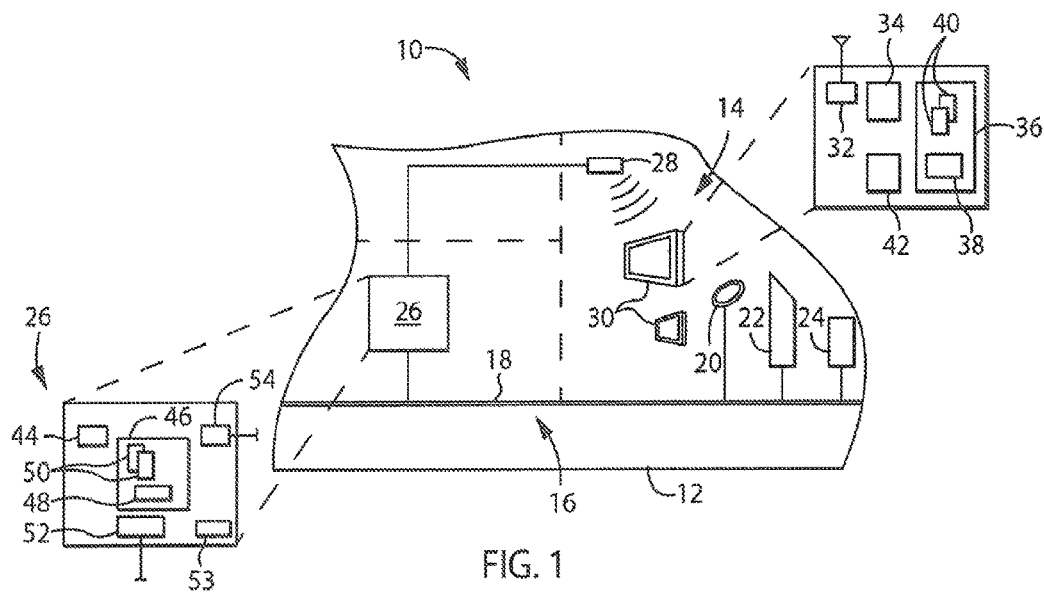
FIG. 1 is a simplified representation of an aircraft suitable for use with the present invention showing an avionics data server communicating with an avionics bus for wireless communication of avionics data with portable electronic devices such as tablets and smart phones in the aircraft cockpit.

Referring now to FIG. 1, the present invention may be employed in an aircraft 10 having an airframe 12 holding a cockpit 14 and avionics bay 16.

At least one avionics bus 18 may route through the airframe 12 to communicate between the avionics bay 16 and the cockpit 14. At the cockpit 14 the avionics bus 18 may connect with aircraft electronics including instrument displays 20. These instrument displays 20 may provide information to the pilot including airspeed, altitude, vertical acceleration, heading and time as well as communications such as those received over an aircraft communication addressing and reporting ACARS or similar system.

The avionics bus may also communicate with other instrumentation including aircraft controls 22, aircraft radar 24 and other aircraft sensors and pilot input devices. Generally the avionics bus 18 carries information critical to the safety and performance of the aircraft 10.

The avionics bay 16 may hold an avionics data server 26 reading information from the avionics bus 18 to provide for a number of functions related to communication among the devices of the aircraft 10 in the present invention; these functions include generating image frames constructed from avionics data on the avionics bus 18. These image frames may be communicated via one or more direct wired connections or one or more wireless access points 28 with portable electronic devices (PEDs) 30 such as tablet computers and smart phone devices typically in the cockpit 14. Example PEDs 30 include tablet computers epitomized by those manufactured by Apple Computer under the iPad trademark and/or smart phones, for example, including those manufactured by Apple Computer under the iPhone trademark as well as equivalent devices from other manufacturers. The present invention also contemplates a direct wired connection between the avionics data server 26 and the portable electronic devices 30 can be used.

As is generally understood in the art, such PEDs 30 include a wireless transceiver 32 such as a Bluetooth, Wi-Fi (e.g., IEEE 802.11), or other similar communication devices controlled by a general-purpose computer processor 34 and/or data communication port. The processor 34 may access a memory 36 holding an operating system 38 and one or more PED application programs 40 as will be described such as are executable by the processor 34. In addition, the processor 34 may communicate with an interface display 42, for example, a touch screen, allowing for the display of image data and the receipt of user commands through a touch interface. The PED 30 may also include specialized hardware for decoding image data at video speeds.

Referring still to FIG. 1, the avionics data server 26 may include one or more processors 44 communicating with a memory system 46, for example, including dynamic random access memory and nonvolatile disk or solid-state storage. The memory system 46 may include an operating system 48 executable by the processors 44 as well as multiple server application programs 50 corresponding to the PED application programs 40 as will be described below. The avionics data server 26 may also include an avionics interface 52 for interfacing with one or more avionics buses 18 and a second interface 54 for communicating with the wireless access points 28, for example, using Ethernet or the like. In one embodiment, the avionics data server 26 also includes a hardware signature generation circuit 53 that may receive image data and produce a signature of that image data in real time at video frame rates for multiple sessions. The hardware signature generation circuit 53 may, for example, be a field programmable gate array program for this purpose.

Figure 2:
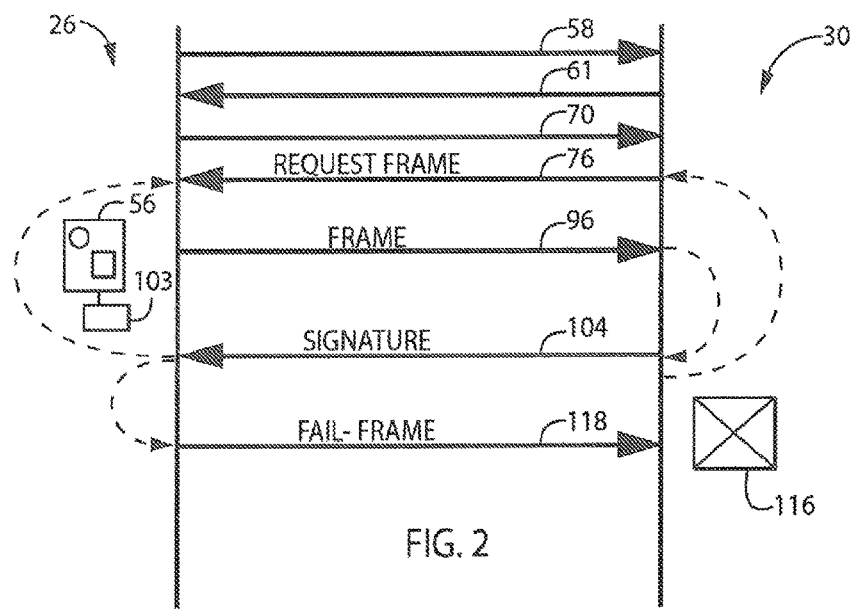
FIG. 2 is a data flow diagram showing data flow between the avionics data server and the portable electronic devices according to the present invention.
Figure 3:
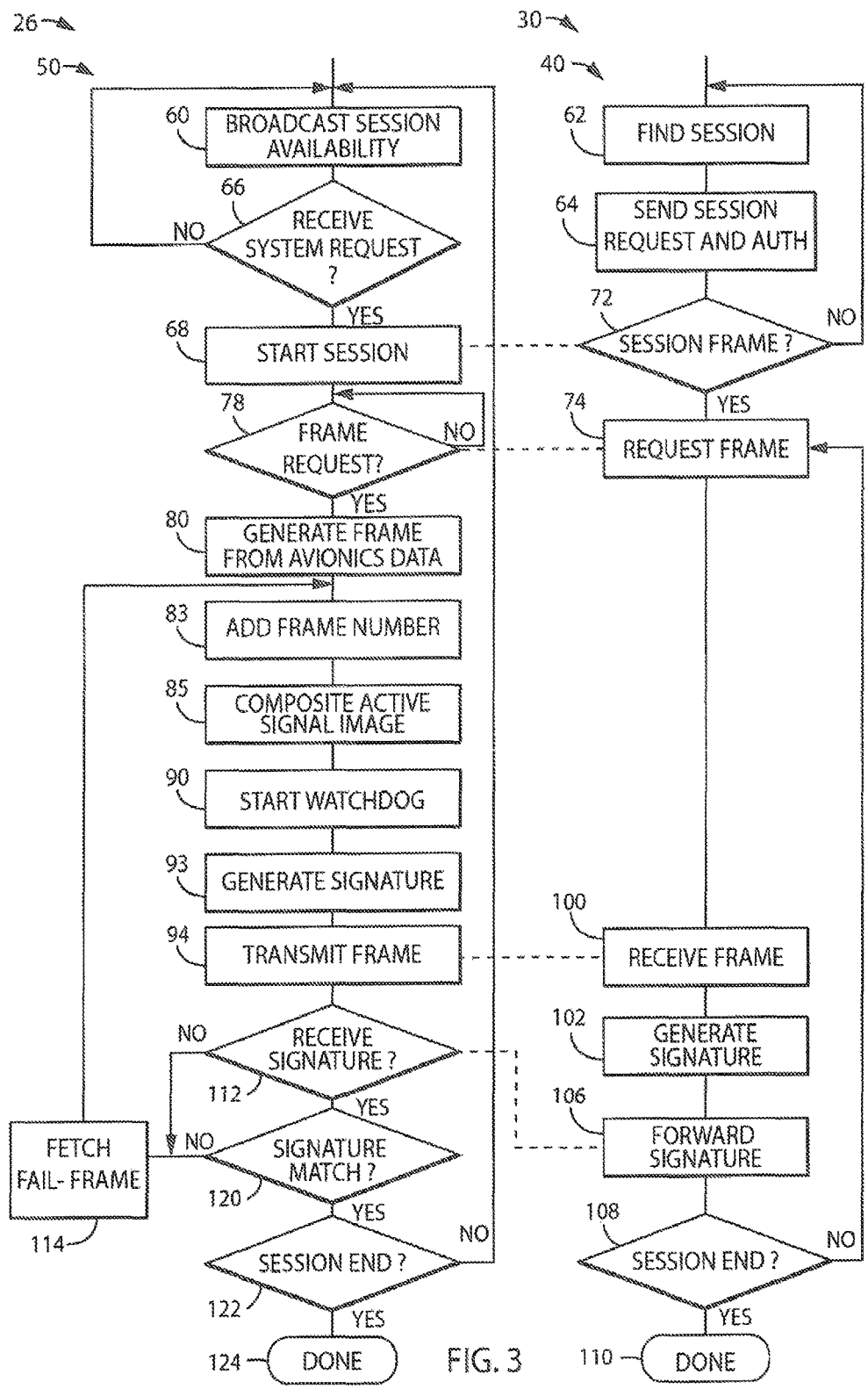
FIG. 3 is a flowchart of concurrently executing programs on the avionics data server and portable electronic device in implementing the data flow of FIG. 2.

Referring now to FIGS. 1, 2 and 3, a system formed of the avionics data server 26 and one or more portable electronic devices 30 concurrently executing corresponding server application programs 50 and PED application programs 40 may provide for the communication of sequential image frames 56 from the avionics data server 26 to the portable electronic devices 30. This communication may occur through one or more wireless access point 28, The image frames 56 will preferably be static image data describing a set of pixel values of color and/or grayscale over rows and columns of an image (for example as opposed to an animated GIF or the like which could indicate motion even without refreshing). Preferably image frames 56 do not require post-receipt processing for the rasterization of a vector image or the generation of animation; however, post-receipt decompression, for example, conversion from a REG compression format or the like, is contemplated. Ideally the amount of processing by the PED 30 of the image frame 56 is reduced to a minimum and performed, if possible, by dedicated hardware.

As indicated by process block 60, when commissioned, the avionics data server 26 executing server application programs 50 may broadcast a session availability signal 58 that can be received by portable electronic devices 30 executing a corresponding PED application program 40. The signal 58 received by the portable electronic device 30, as indicated by process block 62, may be analyzed by the desired PED application program 40 running on the PED 30 to see if the application program 40 is supported. For example, server application program 50 may generate image frame data related to a display available on instrument displays 20 (shown in FIG. 1) depicting heading information which would support an application program 40 that displayed heading information. A single application program 40 may provide for the display of one or multiple types of avionics data.

At process block 62, a corresponding PED application program 40, in this example for the display of heading information at the PED 30, confirms the availability of data corresponding to this application program 40 and upon such confirmation, transmits a session request 61 as indicated by process block 64. This session request 61 may include a unique identifier of the PED 30 (such as a MAC address) and identification of the particular PED application program 40. The session request 61 of process block 64 may also include authentication information such as a password or other credentials indicating that the user of the PED 30 is authorized to connect with the avionics data server. This authentication which may also incorporate the unique identifier of the PED 30 is intended to prevent unauthorized users from establishing a link with the avionics data server 26. This session request 61 may also provide hardware capabilities of the portable electronic device 30 including, for example, a display size, receivable frame rate and type of display.

As indicated by decision block 66, the avionics data server 26 may respond to a properly structured and authenticated session request of process block 64 by starting a session as indicated by process block 68. The beginning of the session may be signaled to the PED 30 with a session start signal 70. A session start signal 70 is provided only if the PED 30 is properly authenticated and the avionics data server 26 can respond to the desired PED application program 40 and can generate image frame data compatible with the PED 30.

When session start signal 70 is communicated to the PED 30 and detected as indicated by decision block 72, the PED 30 stops looking for a session at process block 62 and requests the transfer of data initiated by a frame request 76 for a single image frame as indicated by process block 74.

Upon receipt of a frame request 76 at the avionics data server 26, as indicated by decision block 78, the server application program 50 fetches the necessary information from the avionics bus 18 to generate data for an image frame 56, as indicated by process block 80. As noted, this image frame 56 is preferably in the form of data that may be directly displayed on the display 42 of the PED 30 with little or no processing other than by an image decoder. Image frames 56 are typically a static image although a rapid succession of such image frames 56 may create a perception of animation and movement. The generation process may take abstract numerical quantities and render them in the form of fonts, images and the like and may require substantial processing as well as the incorporation of templates and files and the like.

Figure 4:
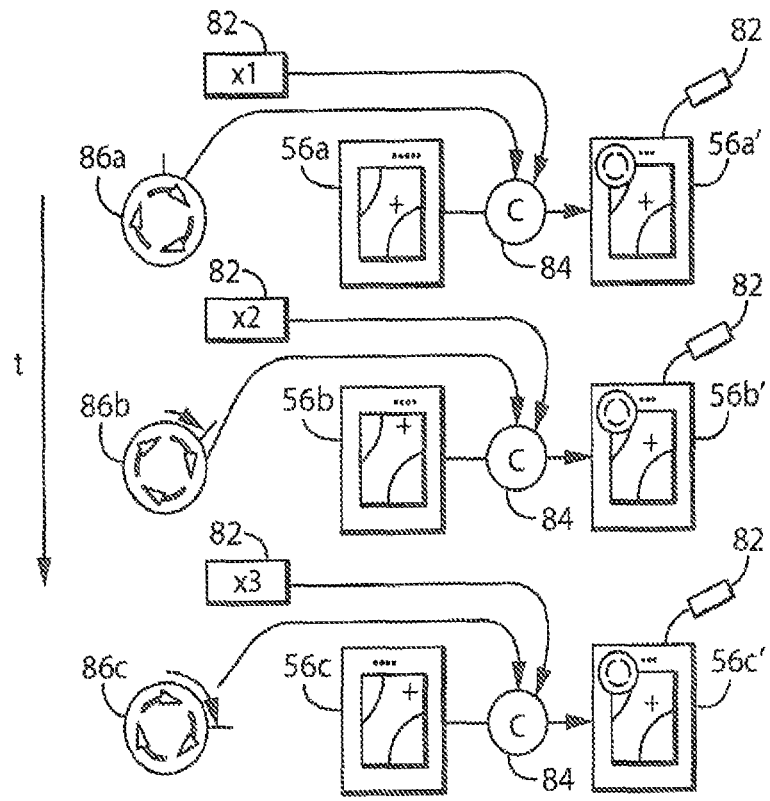
FIG. 4 is a graphical representation of an augmenting process in which transmitted avionics data is composited to include an active-signal animation and frame transmission number.

Referring now also to FIG. 4, after the data of the image frame 56 is fetched, at process block 83 server application program 50 adds a frame number 82 to each image frame 56 to form an augmented image frame 56' for transmission to the PED 30. The frame number 82 provides a unique serial number to all image frames 56 generated at process block 80 with a large modulo unlikely to be repeated during a typical air flight. This frame number 82 may be concatenated to the data of the image frame 56 or embedded in the image frame 56 by a compositor 84, visibly or invisibly as a watermark.

Referring still to FIGS. 3 and 4, at process block 85, the image data may be further composited with one of a set of active-signal images 86, in particular active-signal image 86 changing with each successive image frame 56. Thus, for example, for three successive image frames 56a-56c, three different successive active-signal images 86a-86c may be composited individually to each of the successive image frames 56a-56c. The active-signal images 86a-86c when viewed in sequence are intended to create a perception of predictable continuous motion so that when the underlying composited image frames 56a-56c are displayed on the display 42 of the PED 30, the observer sees a substantially uninterrupted motion in sequence formed by the active-signal images 86. This observed uninterrupted motion indicates to a user of the PED 30 that a regular stream of image frames 56 is being received and displayed.

In one form, the active-signal images 86 provide animation of a rotating object that may be captured with a relatively limited number of different images; however, other animations that serve to provoke an immediate recognition of continuous data transmission by the animation smoothness are also contemplated. The rotating image may include a symbol such as an arrow showing the proper direction of rotation as well. It is anticipated that the avionics data server 26 will serve image frames 56 at video frame rates of at least ten frames per second to provide relatively smooth perceived animation.

As is understood in the art, the compositing process overlays the active-signal images 86 on a portion of the image frames 56 in a manner so that the active-signal image 86 appears to be embedded or to replace a portion of the image frame 56; however, it is contemplated that the overlaying process need not be opaque but may be semitransparent so that the underlying image frame 56 is not wholly obscured or that the animation may be such that any portion of the image frame 56 is not continuously obscured, for example, with an animated sweeping band or propeller arm. This allows the last valid image to be viewed so long as knowledge of its staleness is recognized as indicated by the stationary active-image signal 86.

Referring again to FIG. 3, at process block 90 a watchdog timer is set and linked to the particular frame number of the image frame 56 shortly to be transmitted to the PED 30. This watchdog timer implemented in software will be used to provide a time limit before which communication failure will be indicated as will be discussed below. This watchdog time value, for example, may be set to a small multiple of the frame rate, for example, 5 frames at a 10 frame per second rate.

At process block 93, the avionics data server 26 may generate a signature 103 of the augmented image frame 56', augmented as described above with the active-signal image 86 and possibly the frame number 82. The signature 103 generally provides a compressed representation of the data of the image frame 56', for example; in the form of a cyclic redundancy code (CRC) accepting as an argument each pixel value of the image frame 56. The compression may be lossless but will typically be lossy meaning that the image frame cannot be recovered from the signature. As is understood in the art, comparing this signature 103 to a later signature value of the image frame 56 may be used to detect errors that may be introduced into the image frame 56 during the transmission process. The present invention contemplates that a specialized signature generation circuit 53 is used to generate the signature 103, for example, in the form of a field programmable gate array (FPGA) that can handle high frame rate and bandwidth required for video frame signature generation. The signature 103 is linked to the frame number 82 of the augmented image frame 56' from which it is generated.

At process block 94, the image frame 56 may be transmitted through the wireless access point 28 to the PED 30 as indicated by transmission arrow 96 of FIG. 2. This process may occur concurrently with the generation of the signature 103 at process block 93 to further assist in managing the computational burden of signature generation.

As indicated by process block 100, the PED 30 may receive the transmitted image frame 56' and, at succeeding process block 102, the PED 30 may calculate a signature for the received image frame 56' using the same protocol as used to generate the signature at process block 93 in the avionics data server 26. In this case, because only a single or limited number of sessions are being handled by the PED 30, the calculation of the signature can be handled by the application program 40 without special hardware.

This signature generated at the PED 30 is then forwarded as a confirming signature 104 to the avionics data server 26 as shown in FIG. 2 and indicated in FIG. 3 by process block 106: The confirming signature 104 includes the frame number of the image frame 56 to which it is related so that it can be compared to the corresponding signature 103.

Assuming that the application has not been terminated for other reasons, at decision block 108 the PED application program 40 loops back to process block 74 to request a next frame. Otherwise the process terminates as indicated by process block 110.

Referring still to FIG. 3, at decision block 112, a determination is made as to whether the signature 104 received by the avionics data server 26 occurs before a timeout of the watchdog timer started at process block 90.

If the watchdog has not timed out before the signature 104 is received, the program proceeds to decision block 120 and the signature 103 generated at process block 93 is compared to the return signature 104 for corresponding frame numbers 82, If at decision block 120, both the frame numbers 82 and the signatures 103 and 104 match, the program proceeds to decision block 122 to see if the session has concluded for other reasons and if not loops back to decision block 78. Otherwise, at decision block 122 the session ends as indicated by process block 124.

If at decision block 112, the signature 104 is not received before the timeout of the watchdog timer or if at decision block 120 the signatures 103 and 104 for corresponding frame numbers 82 do not match, the program proceeds to process block 114 and a fail-image 116 is fetched for transmission.

Figure 5:
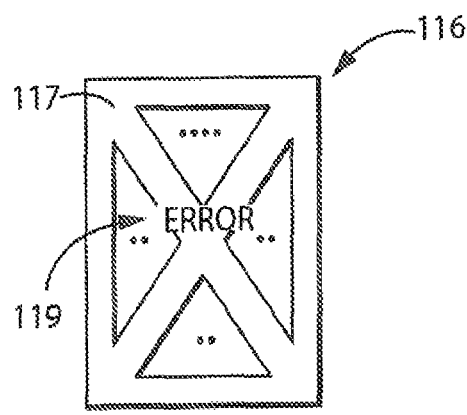
FIG. 5 is a depiction of a fail-image as displayed on a portable electronic device.

As shown in FIG. 5, the fail-image 116 may be any image that unambiguously indicates to a viewer of the display screen of the PED 30 that accurate data is not being displayed. Desirably, the fail-image 116 may provide image portions 117, for example, a large colored "X", together with text 119 indicating the error state. A portion of an underlying image may show through the fail-image 116 (by a compositing process performed at the avionics data server 26) so as to help provide context with respect to what data has now been lost. Importantly the fail-image 116 indicates a failure in the current data from being transmitted to the PED 30 without requiring any activity by the PED 30 other than the normal display of images.

A signature 103 is generated for the fail-image 116 and the frame number 82 and active-signal image 86 are added to the fail-image 116 per the sequences of process blocks 83, 85, 90, and 93; however, the fail-image is transmitted even without a request from the PED In this way the signature checking of decision blocks 112 and 120 may be performed on the fail-image 116 so that normal transmission may again resume if the failure is remedied. This approach improves the availability of transmitted data; however, it is contemplated that a certain level of failure may be used to also cause the application to terminate completely.

It will be understood from the above description that most of the processing required by this process of communicating data through the PED 30 is done by the avionics data server 26 and the PED 30 provides only rudimentary, and possibly hardware-implemented, image display greatly minimizing the possibility that failure of the PED 30 software, operating system or hardware will interfere with the transmission process or produce misleading information.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed:

References to "a microprocessor" and "a processor" "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. An avionics data server comprising:
   a first interface communicating with one or more avionics buses conveying avionics data related to a safe operation of an aircraft; and
   a second interface communicating with at least one portable electronic device having an electronic display;
   wherein the avionics data server includes a processor executing a program stored in non-transient medium to:
   (1) generate an image frame at the avionics data server from the avionics data, the image frame displayable to provide information related to the safe operation of the aircraft;
   (2) determine a signature at the avionics data server, the signature providing a representation of data of the image frame;
   (3) forward the image frame from the avionics data server via the second interface to the portable electronic device;
   (4) receive a confirming signature from the portable electronic device to the avionics data server, the confirming signature providing a representation of the image frame as received by the portable electronic device; and
   (5) compare the confirming signature to the signature at the avionics data server and, when they do not match, forwarding a fail-image frame to the portable electronic device, the fail-image frame displayable to provide information indicating an unreliability of displayed information on the portable electronic device.

2. The avionics data server system of claim 1 further including a step of attaching a frame sequence number to the image frame linked to the signature and wherein the step of returning a confirming signature links the confirming signature to a frame sequence number of a received image frame and wherein the step of comparing the confirming signature to the signature compares a confirming signature and signature having matching frame sequence numbers.

3. The avionics data server system of claim 1 further including a step of setting a timer at step (3) and determining that the confirming signature and signature do not match at the expiration of a predetermined time after setting of the timer if a matching signature and confirming signature is not established.

4. The avionics data server system of claim 1 further including a step of authenticating the portable electronic device for communication of image frames from the avionics data server to the portable electronic device.

5. The avionics data server system of claim 1 further wherein the signature is a cyclic redundancy code applied over the data of the image frame.

6. The avionics data server system of claim 1 wherein the avionics data server includes a hardware signature generator generating the signature of step (2) independently from the processor of the avionics data server.

7. The avionics data server system of claim 6 wherein the hardware signature generator is a field programmable gate array.

8. The avionics data server system of claim 1 wherein step (3) is performed in response to a request for an image frame communicated from the portable electronic device to the avionics data server for each image frame.

9. The avionics data server system of claim 1 wherein the image frame displays as a static image.

10. The avionics data server system of claim 9 wherein the image frame provides a set of pixel values for pixels ranging over two dimensions.

11. The avionics data server system of claim 1 wherein steps (1)-(5) are repeated at a rate of at least 10 times per second.

12. An avionics data server comprising:
    a first interface communicating with one of more avionics buses conveying avionics data related to a safe operation of an aircraft; and
    a second interface communicating with at least one portable electronic device having an electronic display;
    wherein the avionics data server includes a processor executing a program stored in non-transient medium to:
    (1) generate an image frame at the avionics data server from the avionics data, the image frame displayable to provide information related to a safe operation of the aircraft;
    (2) determine a signature at the avionics data server, the signature providing a representation of data of the image frame;
    (3) forward the image frame from the avionics data server via the second interface to the portable electronic device;

(4) receive a confirming signature from the portable electronic device to the avionics data server, the confirming signature providing a representation of the image frame as received by the portable electronic device; and (5) compare the confirming signature to the signature at the avionics data server and, when they do not match, forwarding a fail-image frame to the portable electronic device, the fail-image frame displayable to provide information indicating an unreliability of displayed information on the portable electronic device;

further including a step of repeating at least step (1) to forward sequential image frames and compositing each image frame before step (3) with an active-signal animation frame of an animation set so that a different active-signal animation frame is composited with sequentially forwarded image frames and so that successive active-signal animation frames when displayed with the sequential image frames provide a perception of continuous predictable motion in an image generated by the active-signal animation frames indicating receipt of the sequentially forwarded image frames to a human observer.

13. The avionics data server system of claim 12 wherein the animation set provides active-signal animation frames of a rotating object.

14. An avionics server system comprising:
an avionics data server having:
a first interface communicating with an avionics bus conveying avionics data related to a safe operation of an aircraft; and
a second interface communicating with at least one portable electronic device having an electronic display;
wherein the avionics data server includes a processor executing a program stored in non-transient media to:

(1) generate an image frame at the avionics data server from the avionics data, the image frame displayable to provide information related to the safe operation of the aircraft;

(2) determine a signature at the avionics data server, the signature providing a representation of data of the image frame;

(3) forward the image frame from the avionics data server via the second interface to the portable electronic device;

(4) receive a confirming signature from the portable electronic device to the avionics data server, the confirming signature providing a representation of the image frame as received by the portable electronic device; and (5) compare the confirming signature to the signature at the avionics data server and, when they do not match, forwarding a fail-image frame to the portable electronic device, the fail-image frame displayable to provide information indicating an unreliability of displayed information on the portable electronic device;

a portable electronic device providing an electronic display and a processor for executing a program stored in non-transient medium to:

(1) request an image frame via the wireless access point from the avionics data server;

(2) generate a confirming signature based on a received image frame from the request; and (3) display the requested image frame when received on the electronic display.

15. The avionics server system of claim 14 wherein the second interface is a wireless access point.

16. A method of communicating avionics data to a portable electronic device using an avionics data server having:
a first interface communicating with an avionics bus conveying avionics data related to a safe operation of an aircraft; and
a second interface communicating with a at least one portable electronic device having an electronic display;
wherein the method executes a program stored in non-transient media to:

(1) generate an image frame at the avionics data server from the avionics data, the image frame displayable to provide information related to the safe operation of the aircraft;

(2) determine a signature at the avionics data server, the signature providing a representation of data of the image frame;

(3) forward the image frame from the avionics data server via second interface to the portable electronic device;

(4) receive a confirming signature from the portable electronic device to the avionics data server, the confirming signature providing a representation of the image frame as received by the portable electronic device; and (5) compare the confirming signature to the signature at the avionics data server and, when they do not match, forwarding a fail-image frame to the portable electronic device, the fail image frame displayable to provide information indicating an unreliability of displayed information on the portable electronic device.

* * * * *